United States Patent
Stephens (10) Patent No.: US 7,512,070 B2
(45) Date of Patent: Mar. 31, 2009

(54) ADAPTIVE USE OF A TRANSMIT OPPORTUNITY

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 10/602,393

(22) Filed: Jun. 23, 2003

(65) Prior Publication Data

US 2004/0258039 A1    Dec. 23, 2004

(51) Int. Cl.
*H04L 12/28* (2006.01)
(52) U.S. Cl. ............... 370/235; 370/328; 455/452.2; 455/69; 455/509
(58) Field of Classification Search ............... None
See application file for complete search history.

(56) References Cited

U.S. PATENT DOCUMENTS

| | | | |
|---|---|---|---|
| 6,404,756 | B1 | 6/2002 | Whitehill et al. |
| 6,547,668 | B2 | 4/2003 | Kopp |
| 6,611,521 | B1* | 8/2003 | McKay et al. ............ 370/392 |
| 2002/0089927 | A1* | 7/2002 | Fischer et al. ............ 370/229 |
| 2002/0154653 | A1* | 10/2002 | Benveniste ............ 370/447 |
| 2003/0123405 | A1* | 7/2003 | del Prado et al. ............ 370/331 |
| 2003/0236103 | A1* | 12/2003 | Tamaki et al. ............ 455/552.1 |

FOREIGN PATENT DOCUMENTS

| | | |
|---|---|---|
| EP | 0 595 637 A1 | 5/1994 |
| EP | 1 133 094 A2 | 9/2001 |
| EP | 1 161 022 A1 | 12/2001 |
| WO | WO 98/46026 | 10/1998 |
| WO | 2005002157 A1 | 1/2005 |

OTHER PUBLICATIONS

Mustafa Ergen, "IEEE 802.11 Tutorial", 2002, pp. cover, 2, 23, & 30.*
Mangold et al. "IEEE 802.11e Wireless LAN for Quality of Service", Proceedings of the European Wireless, 2002, pp. 1-8.*
Grilo et al., "Performance Evaluation of IEEE 802.1e", IRMRC 2002, pp. 511-517.*

* cited by examiner

*Primary Examiner*—Edan Orgad
*Assistant Examiner*—Jung Park
(74) *Attorney, Agent, or Firm*—Kacvinsky LLC (57) ABSTRACT

Various embodiments are described to adaptively use a transmit opportunity. A wireless system comprising a memory and a processor is described. The processor is coupled to the memory. In one embodiment, the processor allocates a first portion of a transmit opportunity for an initial data burst and the processor allocates a second portion of the transmit opportunity for other operations including retries.

33 Claims, 11 Drawing Sheets

ADAPTIVE USE OF A TRANSMIT OPPORTUNITY

BACKGROUND INFORMATION

In communication systems there are a number of limited resources, such as processing power, memory, bandwidth, etc. A station in a wireless system will often receive one or more opportunities to access a channel or transmit data over a channel. These opportunities to access a channel are also valuable resources, and should be used appropriately. Systems should make the best possible use of each channel access. A technique is desirable to effectively use available transmit opportunities.

DETAILED DESCRIPTION

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, Time Division Multiple Access (TDMA) systems, and the like, although the scope of the invention is not limited in this respect.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example.

Figure 1:
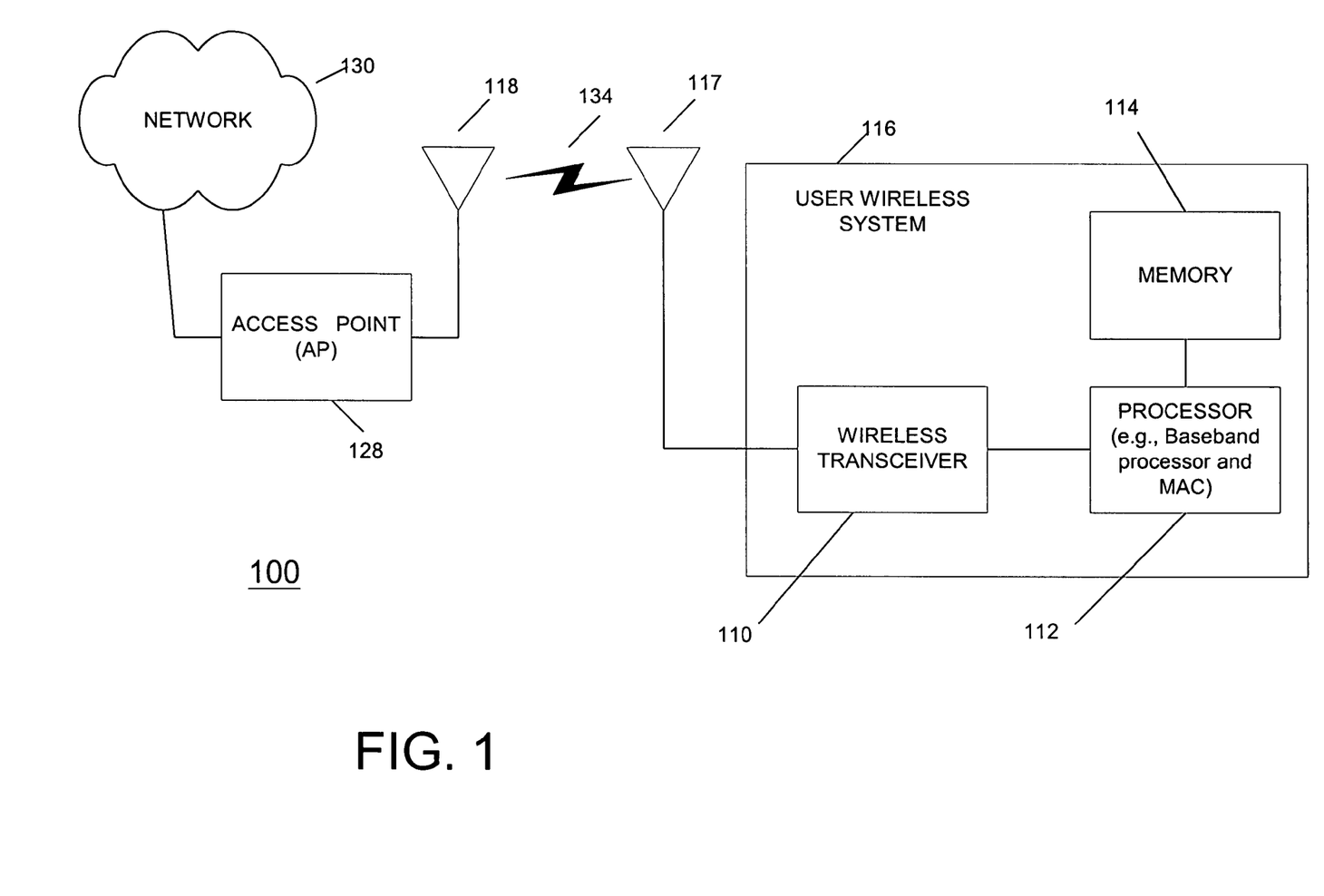
FIG. 1 is a diagram illustrating an example of a wireless communication system in accordance with an embodiment of the invention.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 410 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of functions, which may include one or more functions described below.

Wireless system 116 may communicate with an access point (AP) 128 (or other wireless system) via wireless communication link 134, where access point 128 may include at least one antenna 118. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g, IEEE 802.11n and so on, although the scope of the invention is not limited in this respect.

In another embodiment, communication between wireless system 116 and access point 128 may be implemented via a cellular communication network compliant with a 3GPP standard, although the scope of the invention is not limited in this respect.

Referring to FIG. 1, AP 128 may include a channel access control to control access to one or more communication channels between AP 128 and one or more wireless systems. In one embodiment, the AP 128, through its channel access control, may allow only one user (or one wireless system) to transmit data over a channel to the AP at a time. As examples, there may be only one channel over communication link 134, or there may be multiple channels over communication link 134 via use of frequency division multiplexing or other technique.

The channel access control of AP 128 may control access to the channel by selectively granting users a transmit opportunity (TXOP), for example. According to an embodiment, a TXOP may be a time period during which the wireless system 116 may transmit data to the AP 128 or other station (such as a third party station) over the channel and/or may initiate an exchange of packets with the AP 128 or other station over the channel. This period of time may for the TXOP may be fixed for all TXOPs, or may be adaptively changed by the AP, for example.

According to an example embodiment, wireless systems may obtain permission to transmit information during a transmit opportunity (TXOP) in a variety of different ways. According to one embodiment, TXOPs may be granted permission by AP 128 upon request from a wireless system. For example, a wireless system may listen to the medium for a random number of time slots, and if the medium is quiet, the system may send a request to send (RTS) message. The AP (or other station) may reply with a clear to send (CTS) message which may mean that it is likely that no other station has begun transmitting, and the system has obtained the TXOP.

Alternatively, the user wireless system 116 may schedule one or more TXOPs in advance, such as by requesting TXOPs of a specified duration at requested times or at requested time intervals (e.g, schedule 5 ms TXOP, every 100 ms). These are just two examples of how a wireless system may obtain permission to transmit during a TXOP.

Once a wireless system or station has obtained permission to transmit during a TXOP, the system must determine how to use the time during its TXOP. There may be several different transmit options or modes of operation that the wireless system may select, although the present invention is not limited to multi-mode systems. These transmit modes may include, for example, a first transmit mode that is designed to improve data throughput, and a second transmit mode that is designed to reduce packet delay for one or more packets. These will be described in more detail below.

According to an example embodiment, data throughput may be improved in some cases when a burst of packets are sent during the TXOP (e.g., filling up the entire TXOP with packets and possibly an acknowledgement). However, in some cases, not all transmitted packets may be successfully received by the destination station (i.e., packet transmission failure). In some cases, a transmitting station may retransmit (or retry) the packets that were not successfully transmitted.

Thus, it may be determined whether any retries should be sent in the current TXOP, or sent in one or more subsequent TXOPs.

Figure 2:
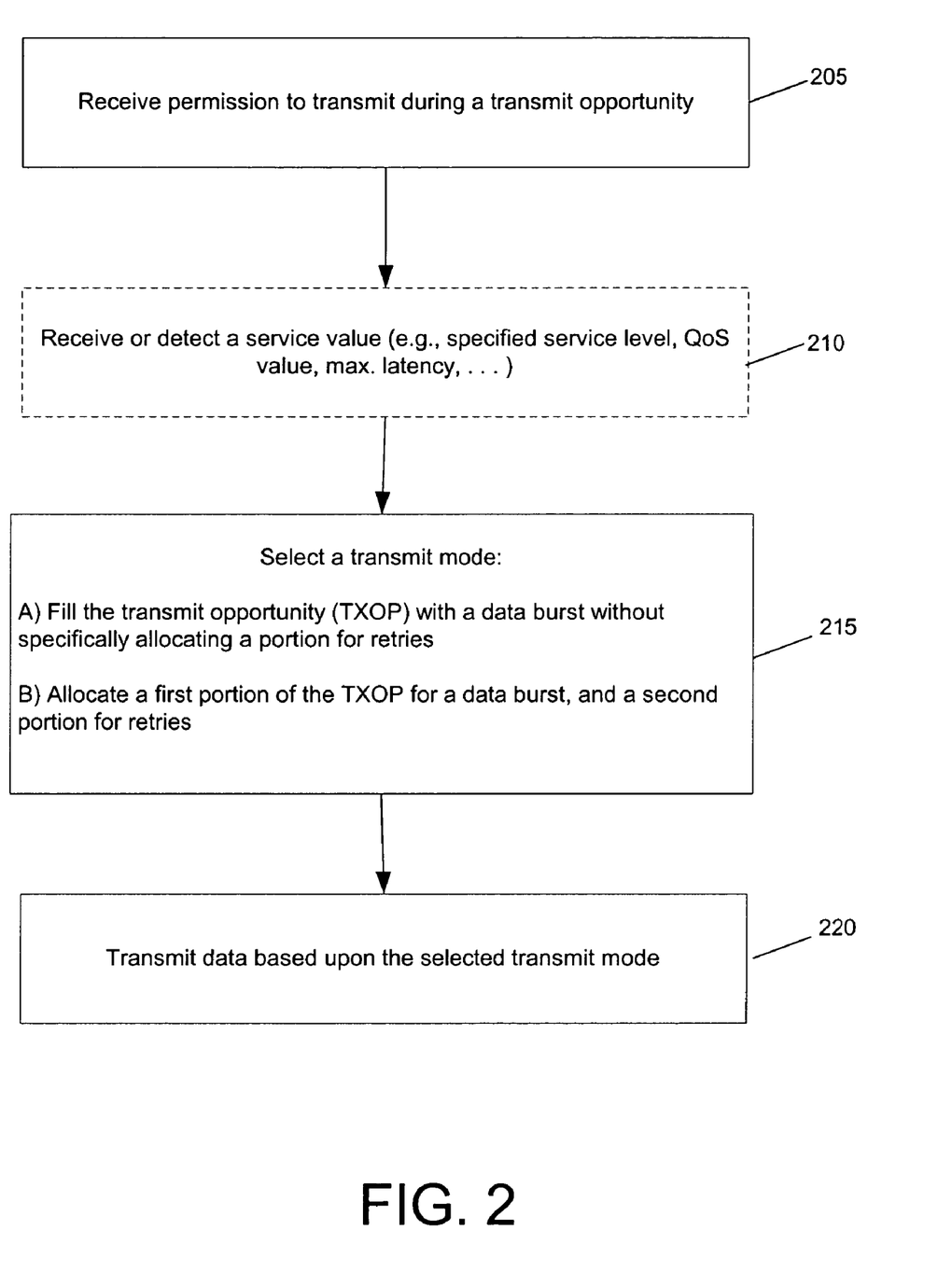
FIG. 2 is a flow chart illustrating operation of a system according to an example embodiment.

FIG. 2 is a flow chart illustrating operation of a system according to an example embodiment. At 205, the wireless system may receive permission from the AP or other station to transmit information (or control the channel or initiate a packet exchange) during a TXOP. As noted above, this TXOP may be obtained in a number of different ways.

At 210, the system may receive or detect a requested service, such as a specified service level, a packet delay request or requirement, a throughput requirement or request, a quality of service (QoS) value or request, or any other service related value. For example, the service request may be set in advance for an application or connection, or may be set in real-time based on a QoS value or other field in a packet. Different applications often have different service needs or requirements. For example, certain real-time applications, such as streaming video or Voice over IP (VoIP) may require low latency or some maximum latency. While other applications are not as sensitive to latency. Block 210 may be optional in some cases.

At 215, according to an embodiment, the wireless system may select one of two transmit modes, although the present invention is not limited to multi-mode systems:

1) a first transmit mode to obtain a overall higher data throughput. In an example embodiment, this may be accomplished, by filling the TXOP with a data burst (i.e., one or more packets) without specifically allocating a portion of the TXOP for retries. According to an example embodiment, throughput may be improved by sending as many packets as possible during the TXOP; Or 2) a second transmit mode to decrease packet delay for a data burst. According to an example embodiment, this may be accomplished by allocating a first portion of the TXOP for an initial data burst, and specifically allocating a second (or remaining) portion of the TXOP for retries from the initial data burst. Depending on the number of packets to be transmitted and the time for the TXOP, this transmit mode may require stopping or interrupting the data transmission when the first portion of the TXOP expires, even though all packets in the system's transmit queue have not yet been transmitted. This may allow the system, in some cases, to detect acknowledgements for any sent packets, and then send any necessary retries during this same TXOP (during a second portion or remaining portion of the TXOP). Thus, by allocating time in the TXOP to send retries, packet delay for those packets may be decreased.

In an example embodiment, a packet or an application may specify, in block 210, that one-way delay for packets should be less than X ms (e.g., less than 100 ms). According to one embodiment, the system may then determine whether this maximum delay requirement (X ms) is less than a threshold. If this maximum delay requirement is less than a threshold, then the system may select the second transmit mode, where a first portion of time is allocated for a data burst and a second or remaining portion of time of the TXOP is allocated for retries. This may allow packet delay or latency to be decreased. Otherwise, the first transmit mode may be selected, where no time is specifically allocated or reserved for retries.

At 220, the wireless system then transmits packets according to the selected transmit mode.

Figure 3:
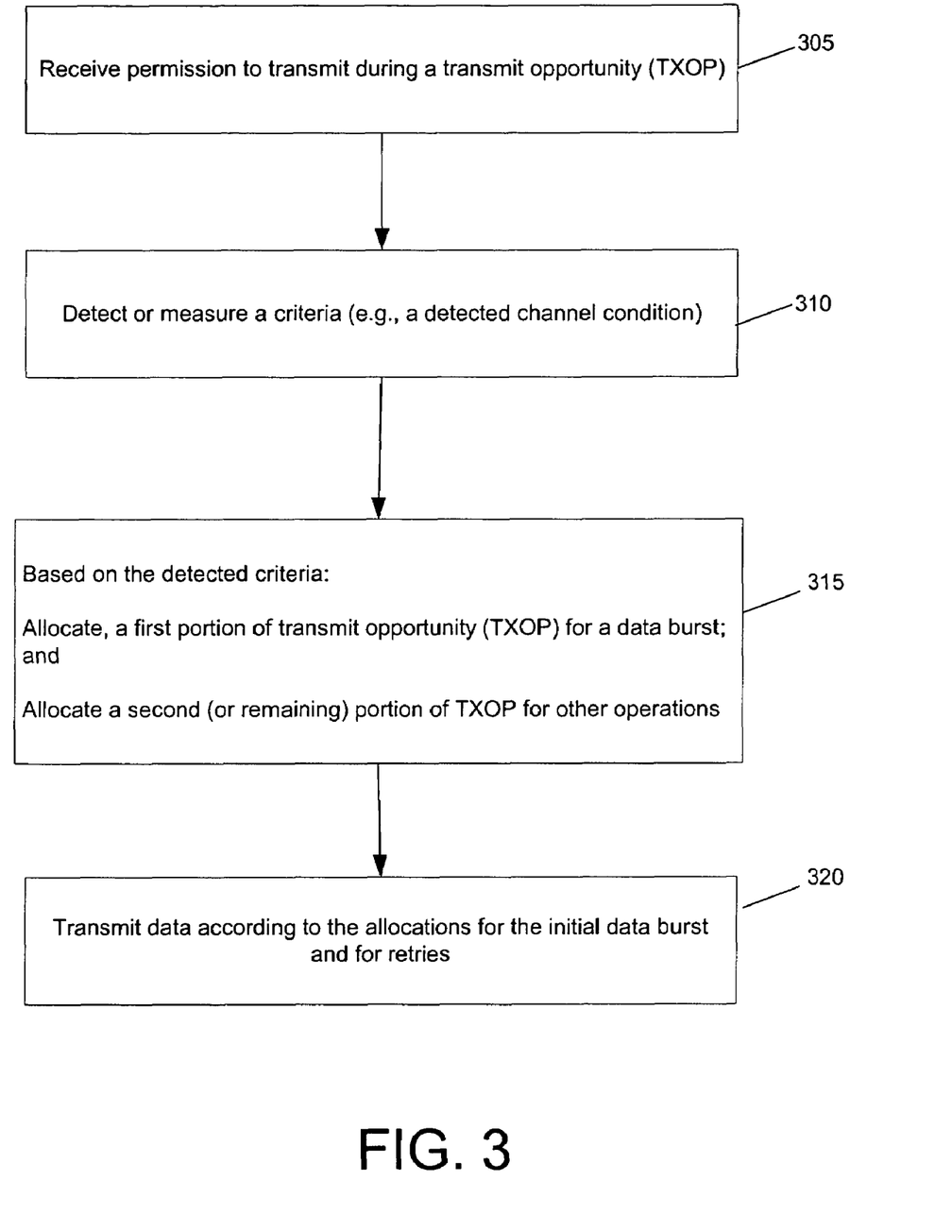
FIG. 3 is a flow chart illustrating operation of a system according to another example embodiment.

FIG. 3 is a flow chart illustrating operation of a system according to another example embodiment. At 305, a wireless system receives permission to transmit during a TXOP.

At 310, the system may detect or measure one or more criteria (or condition). There are a number of different criteria which may be detected or measured. In an example embodiment, the system may measure or detect the condition of a communication channel which the system would like to access or control.

At 315, based on the detected criteria (such as the detected channel condition), the system may allocate a portion of the TXOP. The system may allocate a first portion of the TXOP for an initial data burst (initial transmission of packets which typically may include no retries), and may allocate a second (or remaining) portion of the TXOP for other operations, such as retries for the initial data burst.

According to an example embodiment, the values for the first portion and the second portion of the TXOP may be adjusted or varied based upon the detected criteria, such as the channel condition. In an example embodiment, a TXOP may be for a set time period. Thus, increasing the time for the first portion of the TXOP (for the data burst) will result in decreasing the time for the second portion of the TXOP (for other operations such as retries). Likewise, if the second portion is increased, then the first portion will typically be decreased, so that the total time (first portion+second portion) is equal to the TXOP.

At 320, the data or packets are transmitted based upon the allocation for the TXOP. If the first transmit mode has been selected, block 320 may involve transmitting an initial data burst of packets until the expiration of time of the first portion, and then performing other operations (such as retries) during the second portion of the TXOP. If the second transmit mode has been selected, block 320 may involve transmitting all of the data packets available for transmission until the end of the TXOP, for example.

Figure 4:
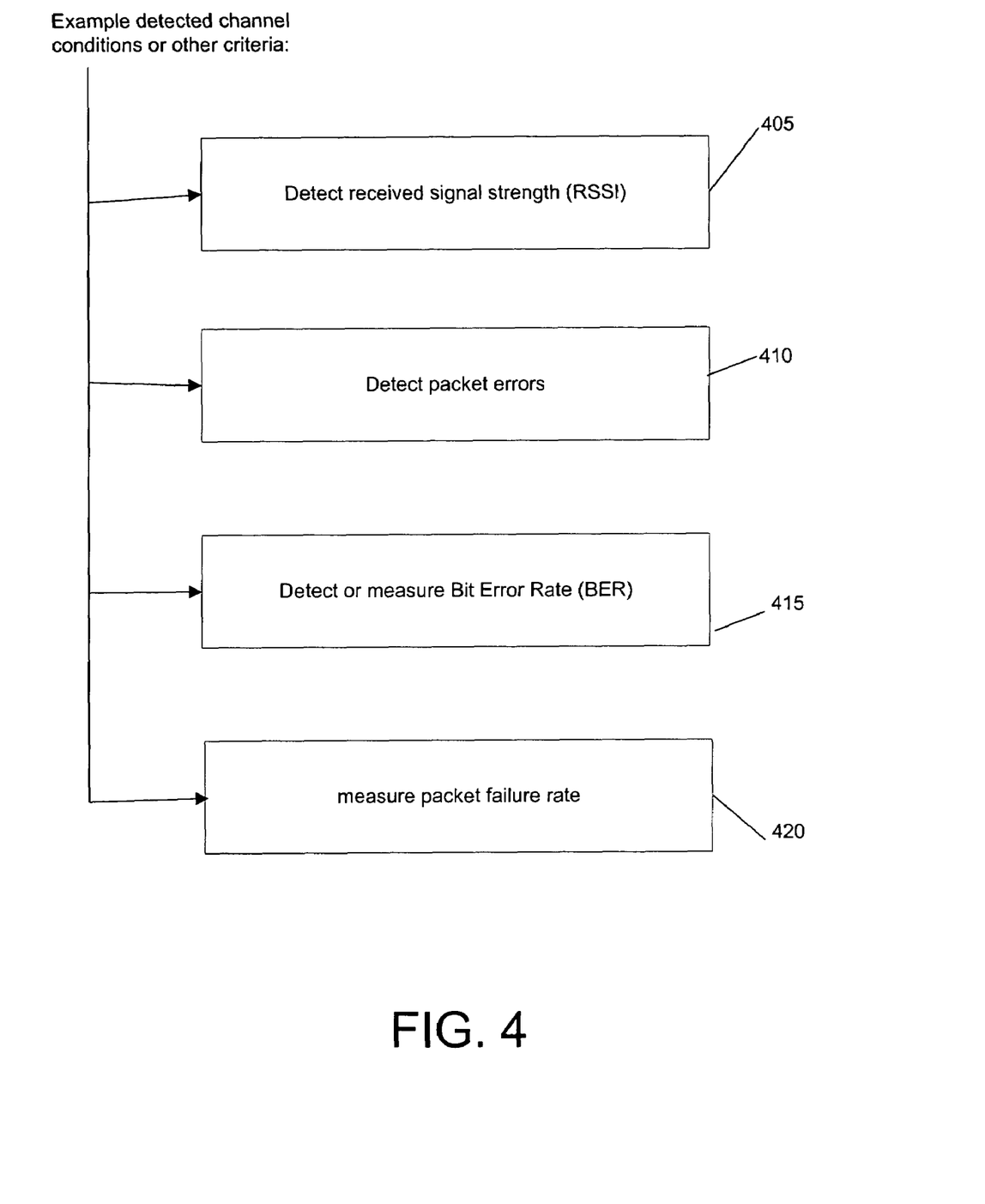
FIG. 4 is a diagram illustrating several examples of how a channel condition may be detected or measured according to an embodiment.

FIG. 4 is a diagram illustrating several examples of how a channel condition may be detected or measured according to an embodiment. According to an example embodiment, detecting or measuring a channel condition at block 310 (FIG. 3) may be performed according to one or more of the techniques described in FIG. 4. In one embodiment, it may be estimated that a degraded channel condition (lower channel quality) may likely result in more packet transmission failures. Thus, more packet retries are typically required for a lower channel quality or a degraded channel condition. On the other hand, a better channel condition (higher channel quality) may likely result in fewer packet transmission failures, and thus, fewer retries.

Referring to FIG. 4, at 405, as one example of detecting a channel condition, the system may measure the received signal strength. The received signal strength may be provided as a received signal strength indication (RSSI), for example. A higher RSSI or higher level of received signal may indicate a better channel condition or higher quality channel, according to one embodiment.

At 410, a system may detect one or more packet failures. This may be performed using well known error detection techniques, such as use of a cyclic redundancy check (CRC). Packet failures may be detected at the transmitting station including by the non-arrival of an expected response (such as an Ack), or at the receiving station (which may then send an Ack or NAK back to the transmitting station).

At 415, the system may detect or measure a bit error rate (BER), which may be, for example, the ratio of bits which failed transmission divided by the total number of bits attempted transmission, over a period of time. At 420, the system may detect or measure a packet failure rate, which may be, for example, the number of packet failures divided by the total number of packet transmission attempts, over a period of time. An increased number of bit errors or increased number of packet failures may indicate a lower channel quality, and thus indicating, on average, that more retries may be necessary.

Other conditions or information may also be detected or measured which may provide an indication of or be correlated in some fashion with the likelihood or probability that a packet will fail to be successfully transmitted. Other criteria or information may be used to allocate time for a TXOP, such as the number of packets in the wireless system awaiting transmission, number of users sharing the channel, the total time for this TXOP, etc.

According to an example embodiment, at block 315 (FIG. 3), as the channel condition improves, the probability of packet transmission failure may typically decrease. In such case, a larger percentage of the TXOP may be allocated for the initial data burst and a smaller percentage of the TXOP allocated for other operations (such as for retries). As an example, an improving channel condition (e.g., lower probability of packet failure) may be detected based on a lower number of bit errors or packet failures, a higher RSSI, etc., some combination of these conditions, or some other measurement or calculation that may be correlated with a lower probability of packet failures.

On the other hand, if the channel condition worsens or degrades at 315, this may indicate a higher probability of packet failures. In such case, the system may allocate a larger percentage of the TXOP for the other operations (such as retries). This is because, as the channel condition worsens, it may be more likely that one or more retries may be sent, on average. An increase in time for other operations in the TXOP may better accommodate the expected number of retries. Thus, by specifically allocating time for retries or other operations during the TXOP, packet latency may be reduced.

Figure 5:
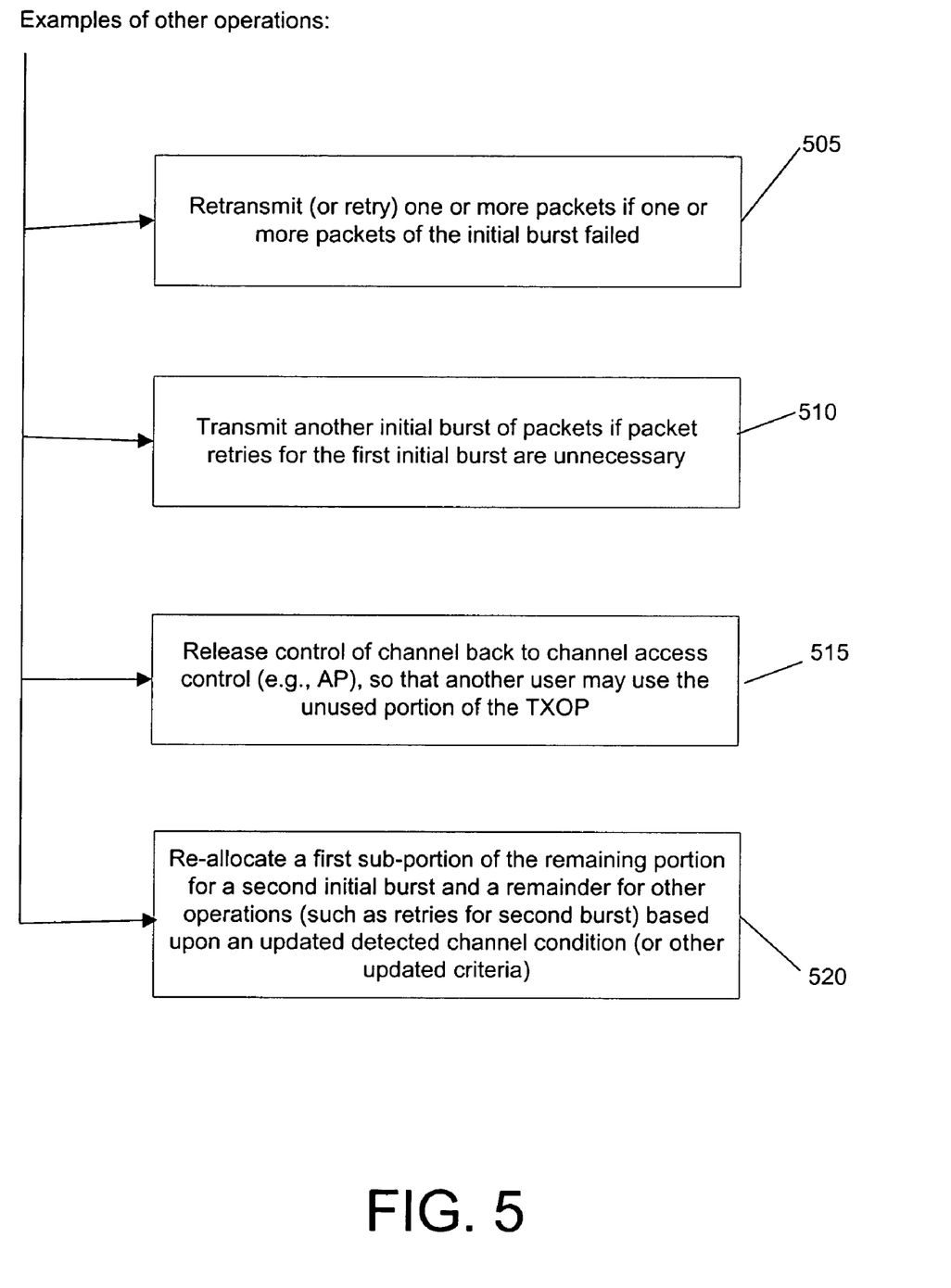
FIG. 5 is a diagram illustrating examples of other operations a system may perform according to an embodiment.

FIG. 5 is a diagram illustrating examples of other operations a system may perform according to an embodiment. In 315 of FIG. 3, the system allocates or reserves a second portion of the TXOP for other operations. The allocations of the TXOP may be in terms of time, number of packets, as examples. There may be one or more operations that the wireless system may perform during this second portion of time that has been reserved. Several examples of other operations are illustrated in FIG. 5, although the present invention is not limited in this repsect.

Referring to FIG. 5, at 505, a system may retransmit or retry one or more packets of the initial data burst which were not successfully transmitted to their destination (packet failures). According to an example embodiment, the second portion of time is allocated primarily for retries. However, in the event that retries become unnecessary, then the second portion of time can be used for a variety of other tasks (see, e.g., 510-520 of FIG. 5). In an example embodiment, for some applications, even though a packet failure occurred, a retry for that failed packet may be unnecessary if too much delay has occurred.

At 510, a system may transmit another data burst of packets during the second portion of the TXOP if, for example, retries of the initial burst are unnecessary. Also, another burst of packets may be sent if very few retries are sent, leaving time left over in the second portion. Retries of the initial data burst may be unnecessary if all of those packets were successfully transmitted to their destination, or if retransmission of one or more failed packets is otherwise unnecessary.

At 515, the system may release control of the channel back to the channel access control of the AP. Control may be released or passed back to the AP by the system sending a control message to the AP. The AP may then allow another user or station to receive channel access to use the unused portion of this TXOP.

Figure 6:
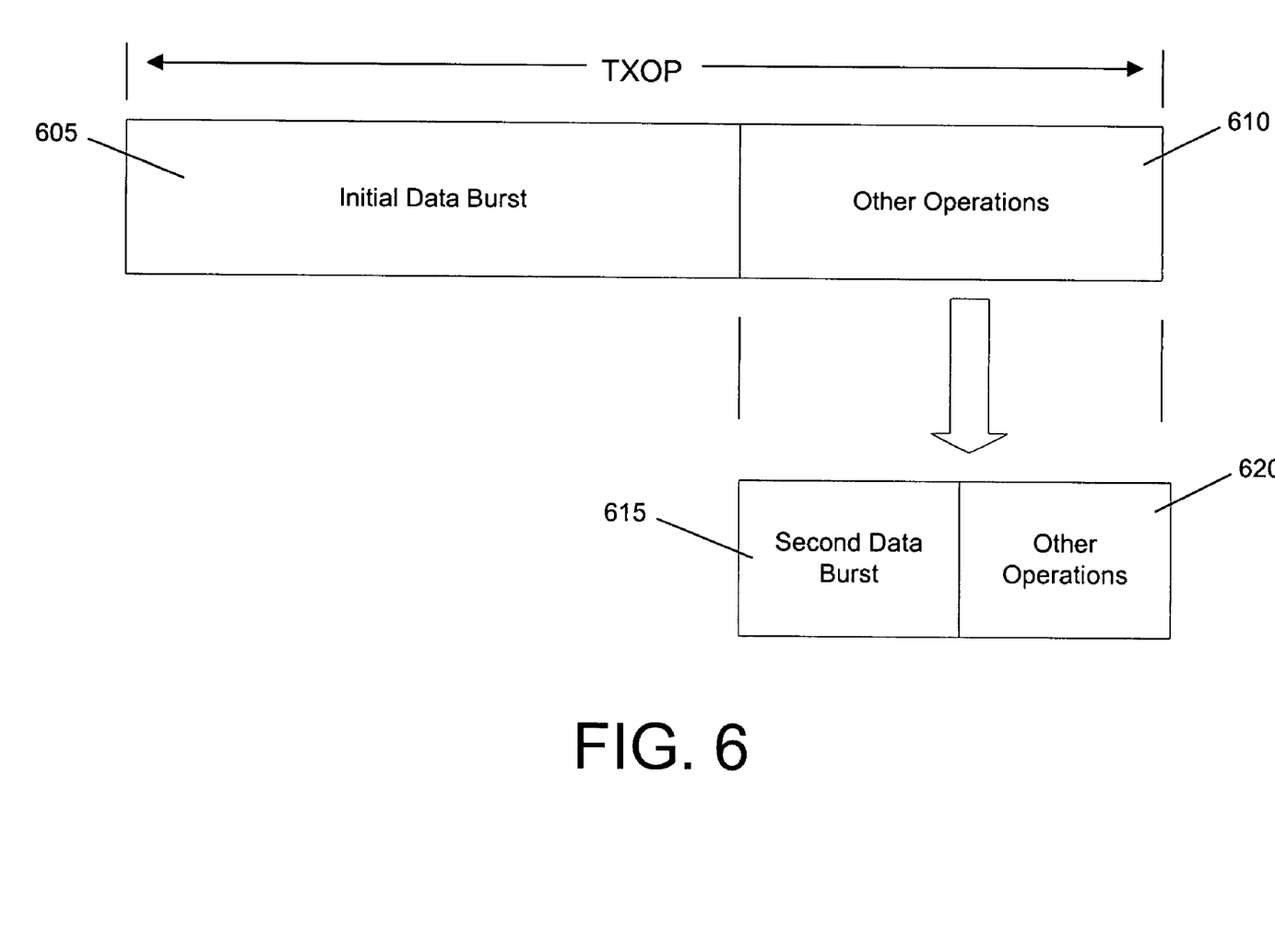
FIG. 6 is a diagram illustrating allocation of time for a TXOP according to an example embodiment.

Block 520 (FIG. 5) will be described with reference to FIG. 6. FIG. 6 is a diagram illustrating allocation of time for a TXOP according to an example embodiment. In FIG. 6, a TXOP is shown including a first portion 605 allocated for an initial data burst, and a second portion 610 allocated or reserved for other operations. Referring to FIGS. 5 and 6, if no retries are sent during the TXOP, at 520, a system may re-allocate the time of the second (or remaining) portion 610 based on one or more updated criteria (e.g., updated channel condition). In an example embodiment, a first sub-portion 615 of second portion 610 may be allocated for a second data burst, while a second sub-portion 620 may be allocated for other operations (such as retries), based upon one or more updated criteria. This process can be repeated for second sub-portion 620. Thus, it can be seen that the process of allocating a TXOP may be repeated for unused portions of the TXOP, based on a current or updated criteria.

Figure 7:
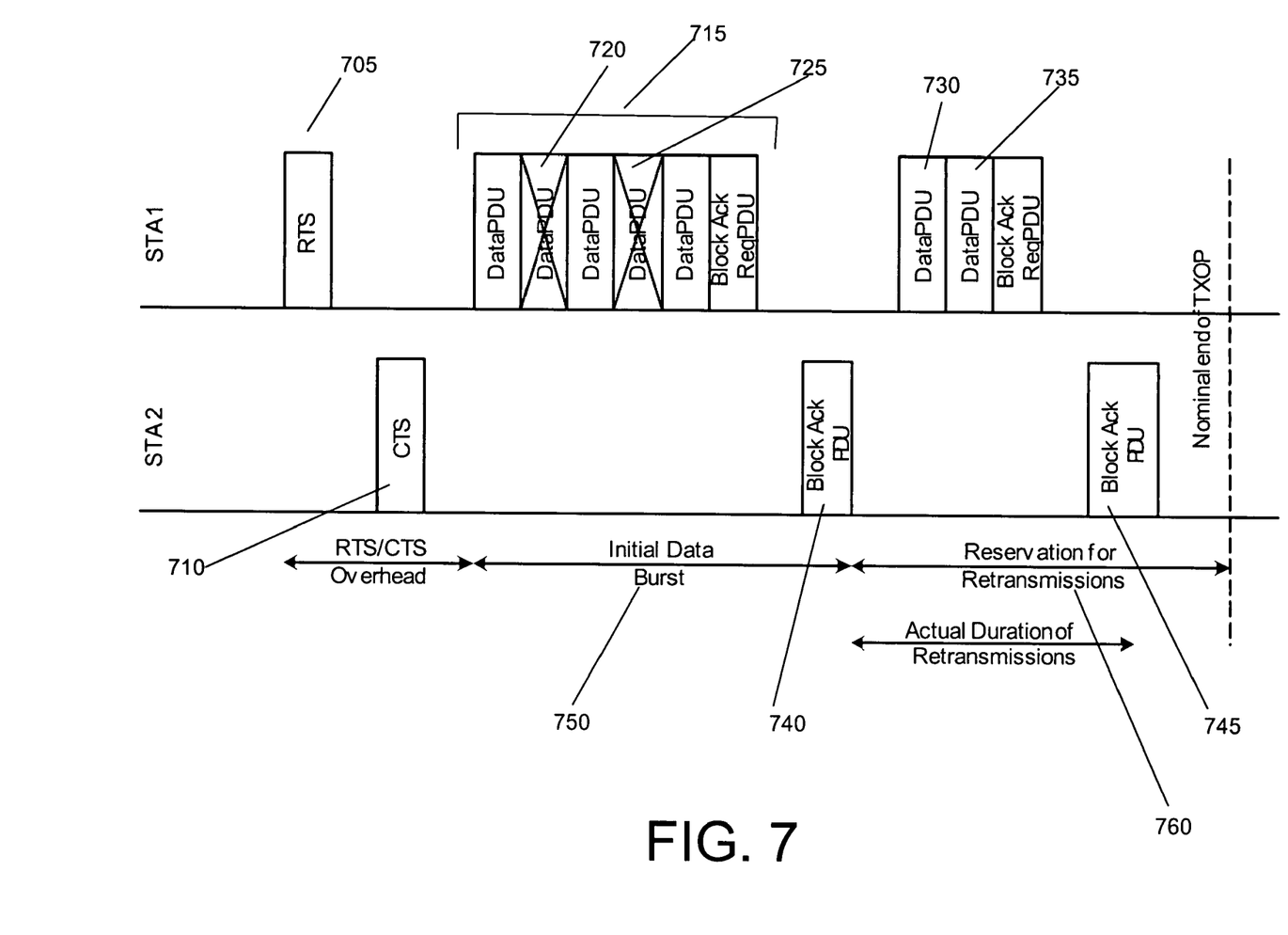
FIG. 7 is a diagram illustrating operation of a system according to another embodiment.

FIG. 7 is a diagram illustrating operation of a system according to another embodiment. Referring to FIG. 7, two stations (or wireless systems) are shown, (STA1, STA2). Station 1 transmits a RTS packet (or protocol data unit) 705, and station 2 responds with a CTS message, thereby gaining a TXOP at station 1. The TXOP is divided by station 1 into a first portion 750 for an initial data burst and a second portion 760 for retries.

During the first portion 750 of the TXOP in FIG. 7, station 1 transmits an initial burst of packets 715 (typically packets sent for the first time, and with few if any retries). However, packets 720 and 725 in the burst fail during the transmission (are not successfully received by station 2). Station 2 replies with one or more acknowledgements to indicate which packets were successfully received. According to an example embodiment, station 2 responds with a block acknowledgement (Ack) 740, which may include a bit map to selectively acknowledge each packet that was successfully received by station 2. In one embodiment, the block Ack may also indicate which packets failed the CRC check (a NAK). However, the block Ack 740 does not acknowledge packets 720 and 725, because these failed.

Therefore, during the second portion 760 of the TXOP (reserved for retransmissions or retries), station 1 retransmits failed packets 720 and 725 as packets 730 and 735, respectively. The receipt of these packets is then acknowledged by station 2 through block Ack 745.

According to an example embodiment, the success or failure of the transmission of a packet may be represented using a probability distribution, such as a Binomial distribution, a Poisson distribution, a Raleigh distribution, and the like. Each packet transmission attempt will typically have two possible outcomes: 1) success (packet successfully transmitted); or 2) failure. Thus, according to an example embodiment, a Binomial distribution may advantageously be used to represent the probability of packet transmission success or failure, although the present invention is not limited in this respect.

Figure 8:
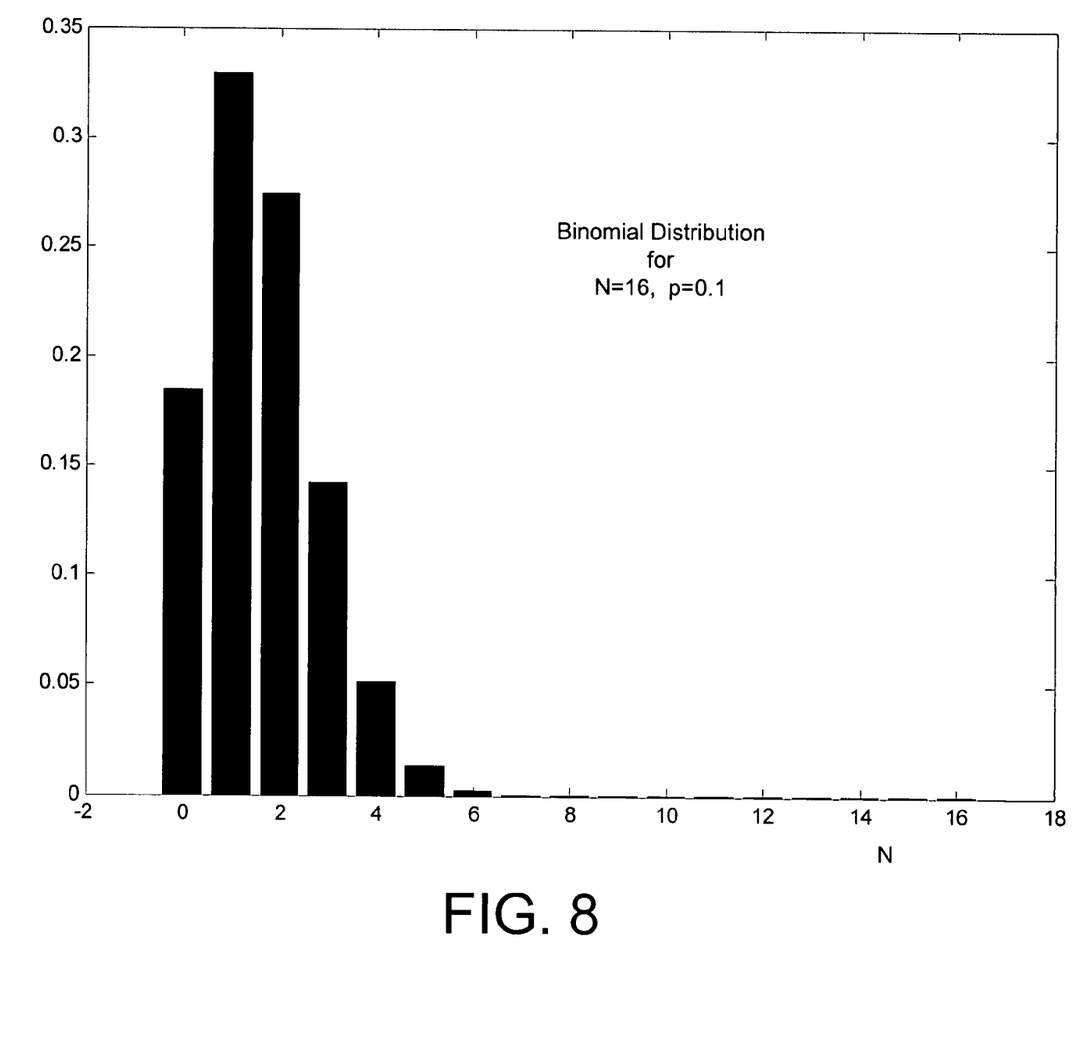
FIG. 8 is a diagram illustrating a Binomial distribution according to an example embodiment.

FIG. 8 is a diagram illustrating a Binomial distribution according to an example embodiment. FIG. 8 illustrates a Binomial distribution for a number of packet failures for a burst length (N) up to 16, and a probability of individual packet failure (p) equal to 10%. This provides an indication of the probability of the number of failed transmissions for a burst length of 16.

Figure 9:
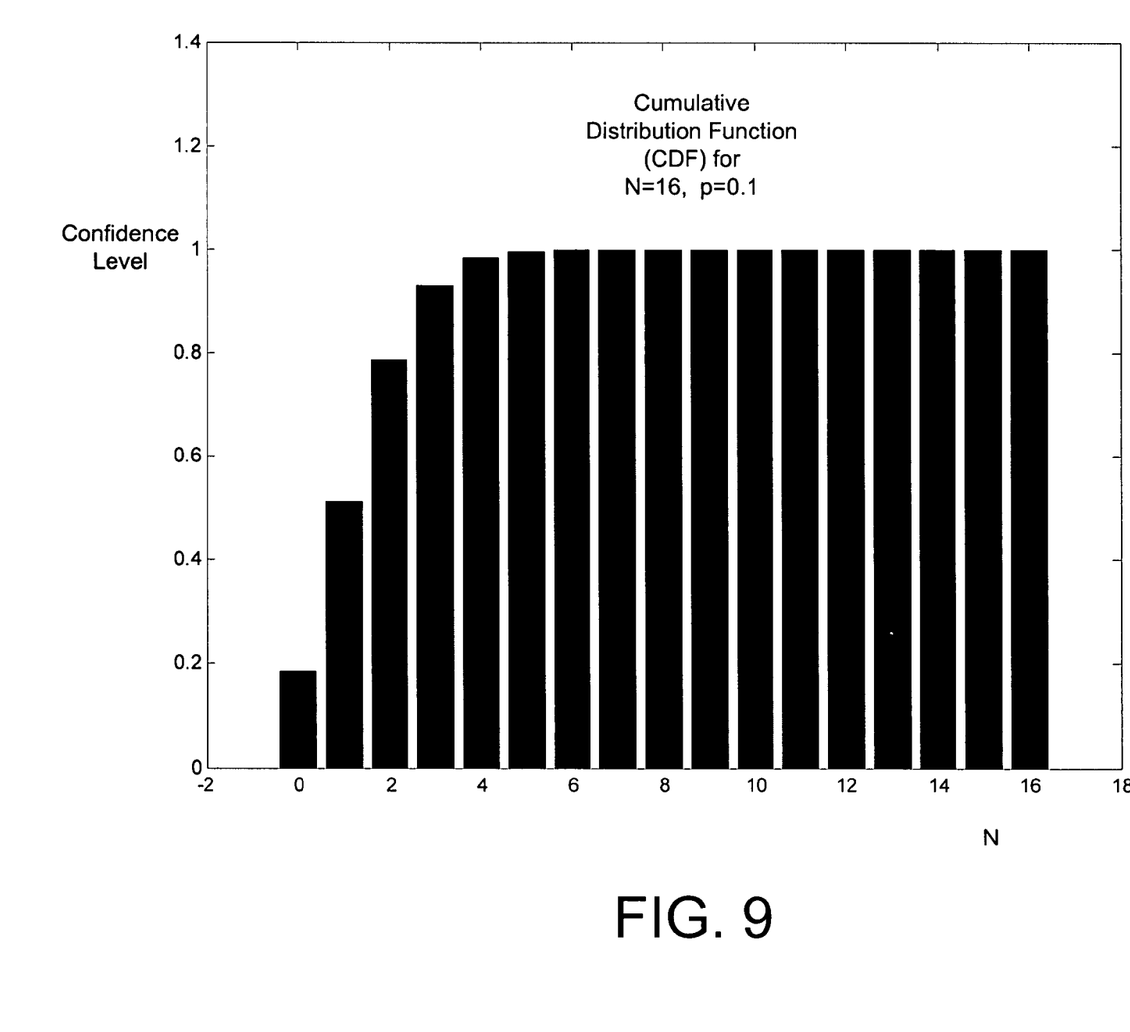
FIG. 9 is a cumulative distribution function (CDF) based upon the Binomial distribution of FIG. 8.

FIG. 9 is a cumulative distribution function (CDF) based upon the Binomial distribution of FIG. 8. The CDF may be obtained by integrating or summing the Binomial distribution of FIG. 8, for example. The CDF of FIG. 9 may be interpreted as indicating the expected maximum number of packet failures (and thus, the expected maximum number of retries) that are likely to occur for a confidence level ranging from zero to 1. In this example (FIG. 9), it is assumed that the initial data burst may include 16 packets and that the probability (p) of individual packet failure is 10%. FIG. 9 identifies the expected maximum number of packet failures and retries for a data burst of 16 packets for a probability of error (p) equal to 10% for a range of confidence levels. For example, as shown in FIG. 9, for the 16 packet data burst at p=0.1, there is a 90% confidence level that there will be three or fewer packet failures.

Thus, while any particular data burst of 16 packets could have more than three packet failures, for a large number of data bursts, approximately 90% of these data bursts should have three or fewer packet failures. In such a case, a second (or remaining) portion of the TXOP can be reserved (for retries) in the TXOP that is sufficient to allow retransmission of three (retry) packets. This should allow retries to be performed in the same TXOP for 90% of the data bursts, assuming a data burst size of 16 packets, and a probability of packet failure=10%. In this example embodiment, it is assumed that each failed packet will be retransmitted (retried), although in general this may not be the case.

Figure 10:
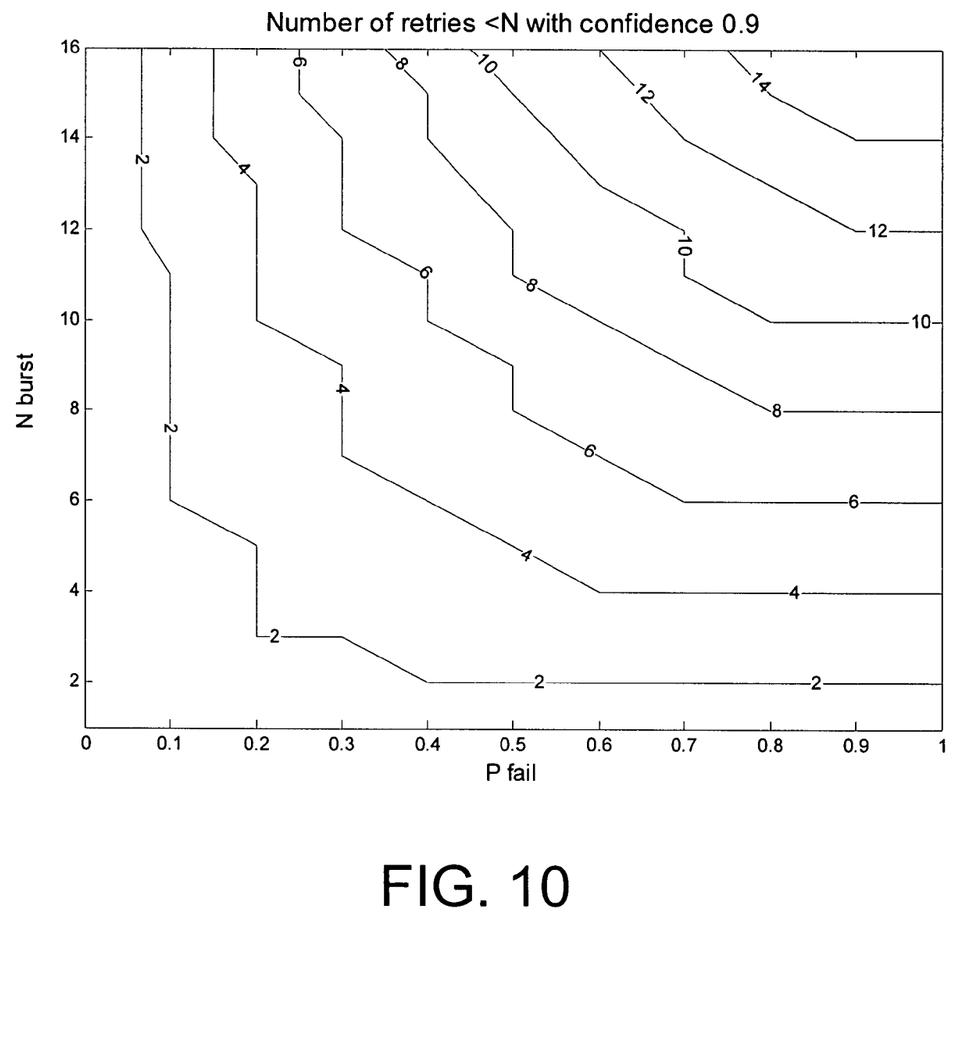
FIG. 10 is a diagram illustrating an expected maximum number of retries for a range of data burst sizes (N) and a range of probabilities of packet failure according to an example embodiment.

FIG. 9 illustrates the cumulative distribution function for just a single case, for burst size of 16 packets, and a probability of packet failure equal to 10%. This information can be calculated for a range of N (initial data burst size) and p (probability of packet failure). FIG. 10 is a diagram illustrating a maximum number of packet failures or retries that will occur on average at a confidence level, for a range of data burst sizes (N) and for a range of probabilities of packet failure.

In FIG. 10, a confidence level of 90% has been chosen as an example. In FIG. 10, for a specific data burst size, there should be an increasing number of packet failures on average as the probability of packet failure increases. For example, in FIG. 10, for a data burst size of eight packets, there will be: two or less retries (packet failures) for p=10%; four or less retries at p=30%; six or less retries at a p=50%; and eight or less retries at p=80% or higher, where p is the probability of packet failure. This example has assumed that each failed packet will be retransmitted (or retried).

Figure 11:
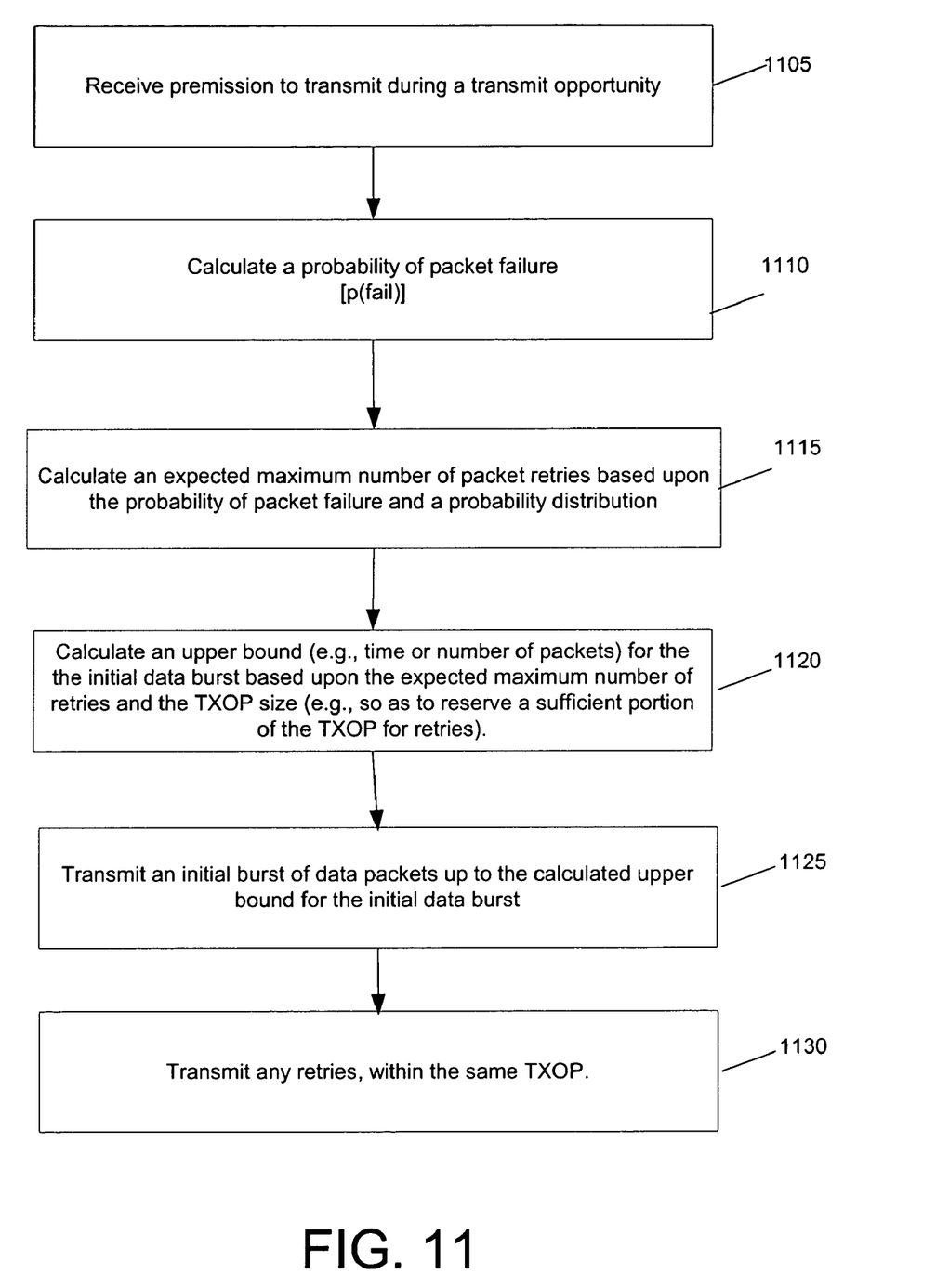
FIG. 11 is a flow chart illustrating operation of a system according to yet another example embodiment.

FIG. 11 is a flow chart illustrating operation of a system according to yet another example embodiment. At 1105, a wireless system may obtain permission to transmit information during a TXOP.

At 1110, the wireless system may calculate a (current or updated) probability of packet failure. This may be calculated, for example, based on the observed packet failures. For instance, the probability of packet failure may be calculated as:

(No. of Packet failures)/(No. of Packet transmission attempts).

Two different counters may be used, for example, including a transmit counter (for the denominator) and a failure counter (for the numerator), although the present invention is not limited in this respect. The number of failures may be determined based upon the acknowledgements received for transmitted packets and/or the negative acknowledgements received (if used). Any packet that is transmitted and the transmitting station does not receive back an Ack within a predetermined time period may be considered a packet failure, as an example. The probability of packet failure may be calculated as a moving average, an average over a fixed observation period, etc. A filter or other technique may be used to adjust the time period over which the average will be calculated to ensure it is responsive so as to represent a current error rate, but not too responsive to provide a value impacted by short term noise.

At 1115 of FIG. 11, the wireless system may then calculate an expected maximum number of packet retries based upon the calculated probability of packet failure and a probability distribution. In one embodiment, the wireless system may calculate an expected maximum number of packet retries based upon a cumulative distribution function (CDF) representing an upper bound on an expected number of retries for the calculated probability of packet failure (P fail), for a range of initial data burst sizes (N burst), for a given confidence level.

This may be performed, for example, by identifying a maximum number of packet retries in the cumulative distribution functions of FIG. 10 for the calculated probability of packet failure (P fail), for a range of initial data burst sizes (N burst). According to an example embodiment, the range of initial data burst sizes (N) may be examined from one packet up to the maximum number of packets which may be transmitted during the TXOP. Allocating a portion of the TXOP to account for this expected maximum number of retries may allow, for example, a data burst to be transmitted along with its retries within the same TXOP for 90% of the initial data bursts.

According to an example embodiment, the maximum number of retries(or time for retries) may advantageously be calculated based on the CDF of FIG. 10 for the given probability of packet failure, and for which the following inequality is satisfied:

$T(Nburst)+T(Nretry)<=TXOP$ size.

Where:

TXOP is the duration or size of the TXOP;

Nburst is the number of packets in the initial data burst (first tries);

Nretry is the number of packet retries (in the retry burst);

T(N) is the time taken to transmit N number of packets;

However, the present invention is not limited in this respect.

At 1120, an upper bound is calculated for the number of packets for the initial data burst based upon the calculated maximum number of packet retries and the TXOP size (or duration). In an example, the TXOP size may be 16 packets (i.e., the duration of the TXOP will allow up to 16 data packets to be transmitted), and the CDF of FIG. 10 indicates an expected maximum of three retries for 16 data packets, at a confidence level of 90% and a probability of packet failure of 10%. Therefore, in this example, a portion of the TXOP may be reserved for three packet retries, thus allowing time for 13 packets in the initial data burst (13 packets being the upper bound for the initial burst for this TXOP). Thus, in an example embodiment, the wireless system may determine a maximum initial data burst size for which both the initial data burst and the expected retries for such data burst will fit in the TXOP, on average.

At 1125, the wireless system then transmits the initial data burst up to the upper bound for the initial data burst. The transmission of data packets may stop before this upper bound is met if the system exhausts its supply of data packets waiting to be transmitted prior to the upper bound. In any event, the system will stop or interrupt the transmission of the initial data burst of packets on or before the upper bound, and then transmit any retries, if necessary. This may involve determining which packets failed, and then retrying these failed packets during the reserved retry portion of the TXOP.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A wireless system comprising:
   a memory;
   a processor coupled to the memory, the processor to allocate a first portion of a transmit opportunity for an initial data burst and to allocate a second portion of the transmit opportunity for other operations including retries, wherein the allocating is performed based upon a detected criteria, the processor to calculate an upper bound for the initial data burst, defining a maximum size for the first portion, the processor to transmit packets of the initial data burst up to the upper bound during the first portion of the transmit opportunity, interrupt or stop the transmission of the initial data burst when the upper bound has been met, and perform other operations including retries of the initial data burst during the second portion of the transmit opportunity, the initial data burst and the other operations including transmitting retries of the initial data burst being transmitted in the same transmit opportunity.

2. The wireless system of claim 1 wherein the wireless system allocates the second portion of the transmit opportunity to retry any failed packets of the initial data burst, if necessary.

3. The wireless system of claim 1 wherein the other operations are one or more selected from the group comprising:
   retry one or more packets in the initial data burst that failed, if any packets failed;
   transmit another initial data burst of packets if there is sufficient time in the transmit opportunity;
   release control of a channel back to a channel access controller; and
   reallocate a first sub-portion of the second portion for a second initial data burst and a remainder of the second portion for other operations.

4. The wireless system of claim 1 wherein the wireless system is adapted to allocate the first portion and the second portion based upon one or more detected criteria.

5. The wireless system of claim 1 wherein the wireless system is adapted to allocate the first portion and the second portion based upon a detected channel condition.

6. The wireless system of claim 5 wherein the detected channel condition is selected from the group comprising:
   received signal strength;
   detected packet errors or failures;
   received bit error rate;
   measured packet failure; and
   other indicia of the probability of packet failure.

7. The wireless system of claim 1, wherein the wireless system further comprises an antenna, a transceiver coupled to the antenna and to the processor.

8. A wireless system comprising:
   a memory; and
   a processor, the processor to estimate a number of packet retries for a data burst based upon one or more detected criteria, the processor to calculate an upper bound for the data burst, defining a maximum size for the first portion, the wireless system to reserve a portion of a transmit opportunity for the estimated retries and then to transmit the data burst during a first portion of the transmit opportunity up to the upper bound, interrupt or stop transmission of the data burst when the upper bound has been met and perform any necessary retries during a second portion of the transmit opportunity, the data burst and any necessary retries are transmitted within the same transmit opportunity.

9. The wireless system of claim 8 wherein the wireless system further comprises:
   a transceiver coupled to the processor; and
   an antenna coupled to the transceiver.

10. The wireless system of claim 8 wherein the processor to estimate the number of packet retries based upon one or more of a measured probability of packet error and a probability distribution.

11. A wireless system comprising:
    an antenna;
    a transceiver coupled to the antenna;
    a processor coupled to the transceiver;
    flash memory coupled to the processor, the wireless system to allocate a first portion of a transmit opportunity for an initial data burst and to allocate a second portion of the transmit opportunity for other operations including retries, wherein the allocating is performed based upon a detected criteria, the processor to calculate an upper bound for the initial data burst, defining a maximum size for the first portion, the processor to transmit packets of the initial data burst up to the upper bound during the first portion of the transmit opportunity, interrupt or stop the transmission of the initial data burst when the upper bound has been met, and perform other operations including retries of the initial data burst during the second portion of the transmit opportunity, the initial data burst and the other operations including transmitting retries of the initial data burst being transmitted in the same transmit opportunity.

12. The wireless system of claim 11 wherein the wireless system allocates the second portion of the transmit opportunity to retry any failed packets of the initial data burst, if necessary, wherein the initial data burst and the retries are transmitted in the same transmit opportunity.

13. A wireless system comprising:
    a processor, the processor adapted to calculate a probability of packet failure, to calculate an expected maximum number of retries based on the calculated probability of packet failure and a probability distribution, and to reserve a portion of a transmit opportunity for retries based upon the expected number of retries, the processor to calculate an upper bound for a data burst, defining a maximum size for a first portion of a transmit opportunity, the processor to transmit the data burst up to the upper bound, interrupt or stop the transmission of the data burst when the upper bound has been met and perform any necessary retries within the same transmit opportunity.

14. The wireless system of claim 13 wherein the processor to calculate an upper bound for an initial data burst based upon the expected maximum number of retries and the size of the transmit opportunity.

15. The wireless system of claim 13 wherein the probability distribution comprises a Binomial distribution.

16. A method comprising:
    receiving permission to transmit information during a transmit opportunity;
    allocating a first portion of the transmit opportunity for an initial data burst based upon a detected criteria;

allocating a second portion of the transmit opportunity for other operations including retries based upon the detected criteria;
calculating an upper bound for the initial data burst, defining a maximum size for the first portion;
transmitting an initial data burst up to the upper bound during the first portion of the transmit opportunity;
interrupting or stopping the transmission of the initial data burst when the upper bound has been met; and
transmitting any necessary retries during the second portion of the transmit opportunity, the initial data burst and the retries for the data burst being transmitted in the same transmit opportunity.

17. The method of claim 16 wherein the allocating of the first and second portions being based upon a detected channel condition.

18. The method of claim 17 wherein the channel condition is selected from the group comprising:
received signal strength;
detected packet errors or failures;
received bit error rate;
measured packet failure; and
other indicia of the probability of packet failure.

19. The method of claim 16 wherein the other operations are one or more selected from the group comprising:
wherein the other operations comprise one or more of the following:
retrying one or more packets in the initial data burst that failed, if any packets failed;
transmitting another initial data burst of packets, if retries are unnecessary, or if there is sufficient time in the transmit opportunity after transmitting any retries;
releasing control of a channel back to a channel access controller; and
reallocating a first sub-portion of the second portion for a second initial data burst and a remainder of the second portion for other operations.

20. The method of claim 16 wherein the receiving permission to transmit information during a transmit opportunity comprises at least one of:
requesting permission to transmit data over a channel; and
receiving permission to transmit data over the channel.

21. The method of claim 16 wherein the receiving permission to transmit information during a transmit opportunity comprises requesting and receiving permission to transmit during a scheduled transmit opportunity.

22. A method comprising:
receiving permission to transmit information during a transmit opportunity;
allocating a first portion of the transmit opportunity for an initial data burst; allocating a second portion of the transmit opportunity for other operations including retries, wherein the allocating is performed based upon a detected criteria, the method comprising:
calculating an upper bound for the initial data burst, defining a maximum size for the first portion; and
transmitting packets of the initial data burst up to the upper bound;
interrupting or stopping the transmission of the initial data burst;
transmitting any retries of the initial data burst, the initial data burst and the retries for the data burst being transmitted in the same transmit opportunity.

23. A method of allocating time during a transmit opportunity, the method comprising:
receiving permission to transmit information during a transmit opportunity;
allocating a first portion of the transmit opportunity for an initial data burst based upon a detected channel condition;
allocating a remaining portion of the transmit opportunity for other operations, the other operations to be determined based upon the success or failure of the transmission of packets in the initial data burst;
calculating an upper bound for the initial data burst, defining a maximum size for the first portion;
transmitting the initial data burst up to the upper bound during the first portion of the transmit opportunity;
interrupting or stopping the transmission of the initial data burst when the upper bound has been met; and
performing any other necessary operations during the allocated remaining portion of the transmit opportunity.

24. The method of claim 23 wherein the other operations include one or more selected from the group comprising:
retrying one or more packets in the initial data burst that failed, if any packets failed;
transmitting another initial data burst of packets, if retries are unnecessary, or if there is sufficient time in the transmit opportunity after transmitting any retries;
releasing control of a channel back to a channel access controller; and
reallocating a first sub-portion of the second portion for a second initial data burst and a remainder of the second portion for other operations.

25. A method of allocating time during a transmit opportunity comprising:
detecting a channel quality or other criteria;
reserving a portion of a transmit opportunity for expected retries based upon the detected channel quality or other criteria;
calculating an upper bound for an initial data burst, defining a maximum size for a first portion of the transmit opportunity;
transmitting the initial data burst up to the upper bound during the first portion of the transmit opportunity;
interrupting or stopping the transmission of the initial data burst when the upper bound has been met; and
transmitting retries during the reserved portion of the transmit opportunity.

26. The method of claim 25 wherein the detecting is selected from the group comprising:
detecting a bit error rate;
detecting packet failure or a packet failure rate;
detecting packet retries;
detecting a signal-to-noise ratio;
detecting a received signal strength.

27. A method comprising:
receiving permission to transmit information during a transmit opportunity;
detecting a criteria;
selecting one of the following transmit modes based upon the detected criteria:
a) allocating a first portion of the transmit opportunity for an initial data burst and a second portion of the transmit opportunity for retries;
calculating an upper bound for the initial data burst, defining a maximum size for the first portion;
transmitting packets of the initial data burst up to the upper bound during the first portion of the transmit opportunity;
interrupting or stopping the transmission of the initial data burst when the upper bound has been met; and performing other operations including retried of the initial data burst during the second portion of the transmit opportunity;
b) not allocating a specific portion of the transmit opportunity for retries; and
transmitting packets during the same transmit opportunity according to the selected transmit mode.

28. The method of claim 27 wherein the criteria comprises a Quality of Service (QoS) field or QoS value or other value.

29. The method of claim 27 wherein transmit mode a) relies upon one or more subsequent transmit opportunities or channel accesses to transmit one or more retries associated with the initial data burst.

30. An article comprising:
a storage medium;
said storage medium including stored thereon instructions that, when executed by a processor, result in:
receiving permission to transmit information during a transmit opportunity;
detecting a criteria;
allocating a first portion of the transmit opportunity for an initial data burst and a second portion of the transmit opportunity for other operations including retries based upon the detected criteria;
calculating an upper bound for the initial data burst, defining a maximum size for the first portion;
transmitting an initial data burst up to the upper bound during the first portion of the transmit opportunity;
interrupting or stopping the transmission of the initial data burst when the upper bound has been met; and
performing during the second portion of the transmit opportunity, the initial data burst and other operations including retries being transmitted in the same transmit opportunity.

31. The article of claim 30 wherein the instructions resulting in detecting a criteria comprise detecting a channel condition.

32. A method comprising:
receiving permission to transmit information during a transmit opportunity;
detecting one or more criteria; and
selecting one of the following transmit modes based upon the detected criteria:
a) a transmit mode in which packets are transmitted so as to decrease latency for at least some of the packets; and
b) a transmit mode in which packets are transmitted so as to increase data throughput;
wherein transmit mode a) comprises reserving a specific portion of a transmit opportunity for retries, the retries transmitted in the same transmit opportunity as an initial data burst, calculating an upper bound for the initial data burst, defining a maximum size for a first portion of the transmit opportunity, transmitting packets of the initial data burst up to the upper bound during the first portion of the transmit opportunity, interrupting or stopping the transmission of the initial data burst when the upper bound has been met, and performing other operations including retries of the initial data burst during a second portion of the transmit opportunity and transmit mode b) comprises transmitting as many packets as possible during the transmit opportunity without specifically reserving a portion of the transmit opportunity for retries.

33. The method of claim 32 wherein the criteria comprises a Quality of Service (QoS) field or QoS value or other value.

* * * * *